Jan. 22, 1963
E. J. DUFFY
3,074,526
LOADING APPARATUS
Filed Aug. 22, 1960
4 Sheets-Sheet 1
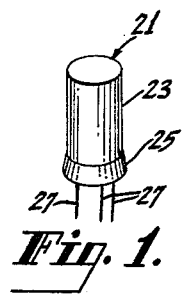
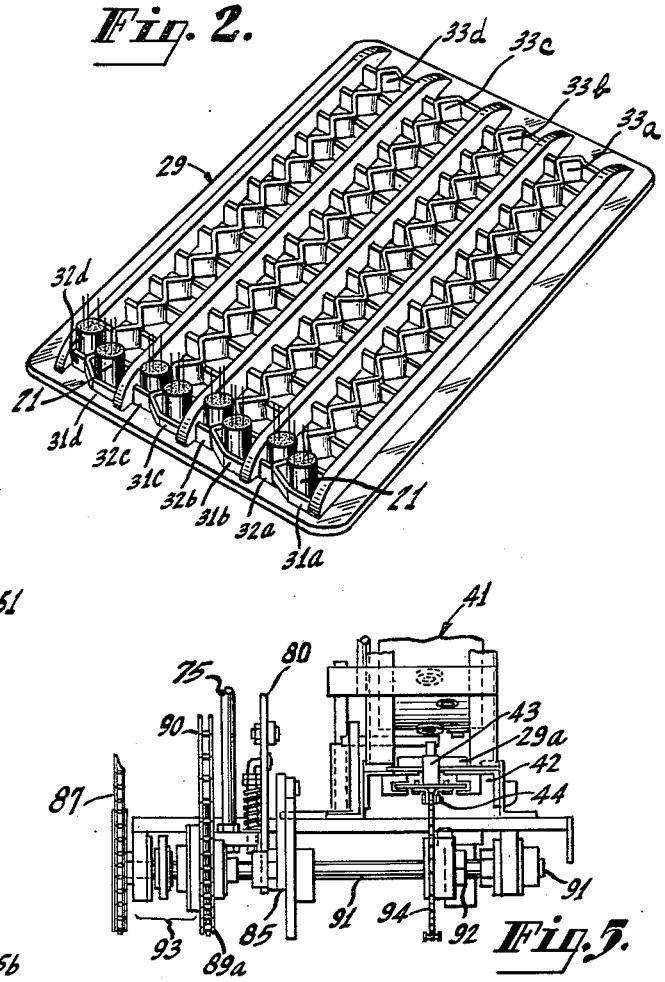
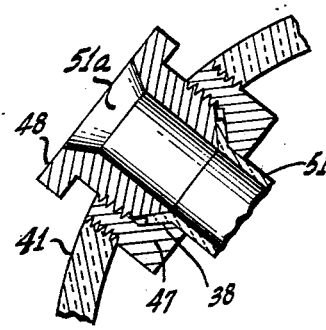
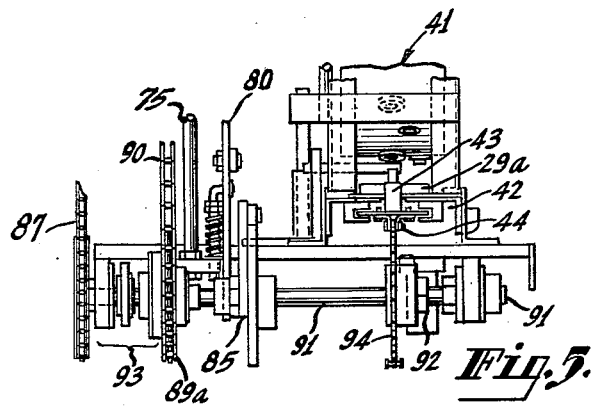
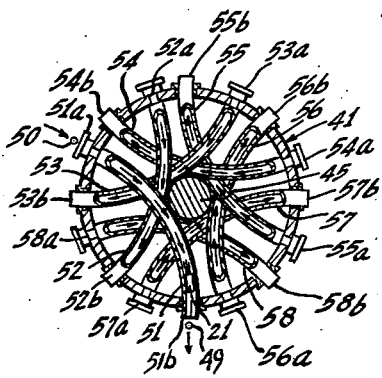
INVENTOR.
EDWARD J. DUFFY
BY
W.S. Hiel
AGENT

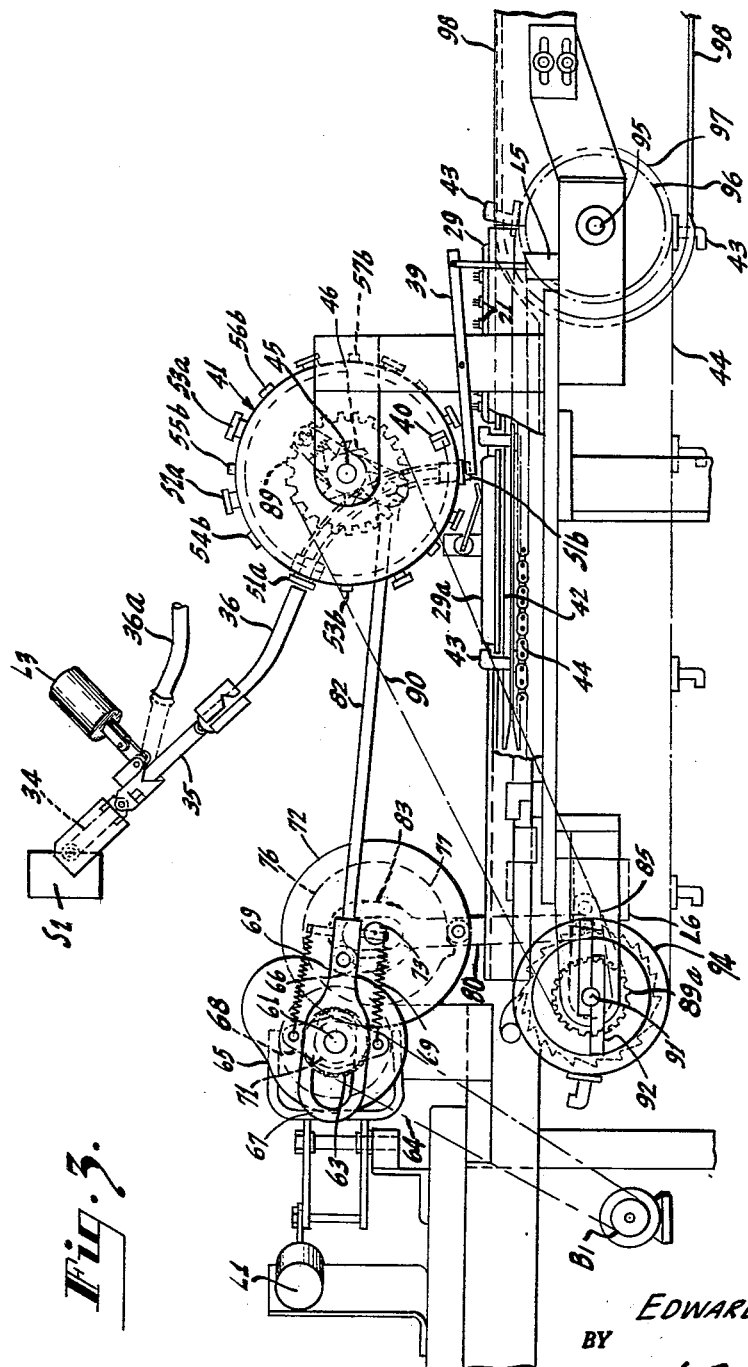

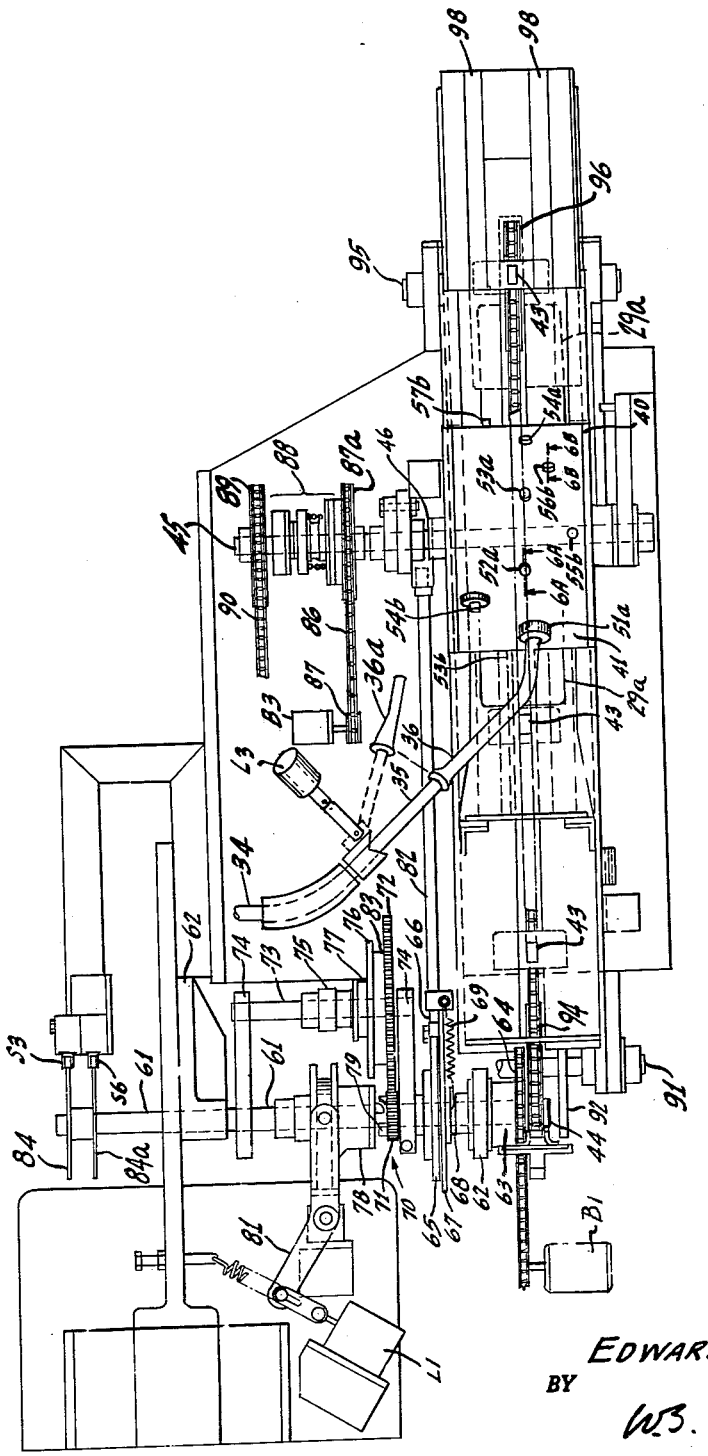

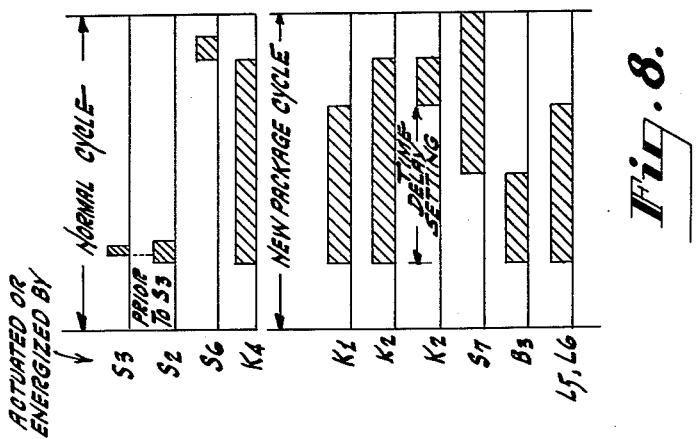
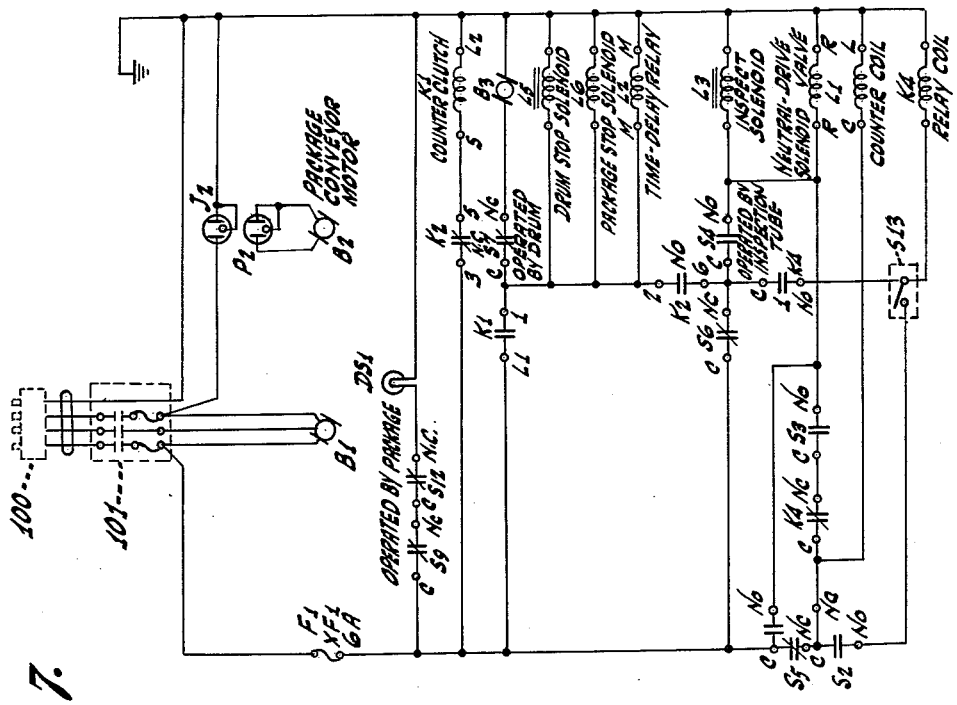

United States Patent Office 3,074,526
Patented Jan. 22, 1963

3,074,526
LOADING APPARATUS
Edward J. Duffy, Bernardsville, N.J., assignor to Radio Corporation of America, a corporation of Delaware
Filed Aug. 22, 1960, Ser. No. 51,066
8 Claims. (Cl. 193—29)

This invention relates to apparatus for loading articles into packages therefor. The apparatus herein may be complete machines in themselves or attachments to other machines.

Following the complete assembly of transistors in cylindrical containers having short leads, the containers are stamped with a brand name and then loaded into packages having an ordered array of nests for the finished transistors. Previous to this invention, the transistors, after being stamped with a brand name, were dropped into a box beside the brand stamping machine. Then, the transistors in the box were loaded manually into the packages.

It is an object of this invention to provide an attachment for a brand stamping machine which will automatically distribute and load brand stamped transistors in an ordered array in packages therefor.

Another object is to provide apparatus for loading cylindrical articles into packages having an ordered array of nests for the articles.

A general object is to provide apparatus for transferring articles according to a predetermined schedule between a single station or point and a plurality of other stations or points.

According to the invention, the foregoing objects are achieved by apparatus for transferring articles between a first point or station and a plurality of other points or stations comprising a rotatable support having an axis of rotation, such as a drum, a plurality of first ports on said support having centers lying in a first plane perpendicular to said axis of rotation, an equal plurality of second ports on said support having centers axially spaced from each other and an equal plurality of passageways, such as tubes, within said support affording communication between one of said first ports and one of said other ports in regular order around said support. The first ports are preferably entry ports and the second ports preferably exit ports, so that articles may be distributed from one point to points along a line. However, the functions of the ports may be reversed so that articles may be taken from points along a line and distributed to a single point in predetermined order.

In a preferred mode of operation, the support is indexed sequentially around its axis of rotation the angular distance from first port to first port, so that one first port is presented to the same point in space with each index. The other ports are angularly spaced from each other so that one other port is presented to the same line in space with each index. With each index, an article is made to pass, as by gravity or by air pressure from the point in space into a first port connected thereto, through the passageway, out its other port, where the article is delivered along the delivery line in its predetermined position. A package, which is positioned immediately below the delivery line receives each article passing through the drum in a particular nest therefor.

Through the use of a single electrical circuit, the drum herein will index only when there is an article to be loaded in the tray. Further, through another electrical circuit and counter, the drum will index and load a predetermined number of articles and then index to starting position before loading articles into succeeding package without interrupting the loading rate after which the cycle will start again.

The apparatus of the invention and the operation thereof are described in greater detail in the following specification and drawings in which:

FIGURE 1 is a perspective view of a typical cylindrical article to be loaded,
FIGURE 2 is a perspective view of a typical package to be loaded with articles of the type illustrated in FIGURE 1 with the devices of the invention,
FIGURE 3 is a side view of a preferred embodiment of the invention,
FIGURE 4 is a top view of the embodiment of FIGURE 3,
FIGURE 5 is a fragmentary end view of the chain conveyor drive of the embodiment of FIGURE 3,
FIGURE 6 is a partially diagrammatic side view of the distributor drum for illustrating its operation, as in the embodiment of FIGURE 3,
FIGURES 6a and 6b are fragmentary sectional side views showing in detail the construction of an inlet port and an outlet port respectively of the drum of FIGURE 6,
FIGURE 7 is a schematic electrical wiring diagram of a circuit for operating the embodiment of FIGURE 3, and
FIGURE 8 is a diagram illustrating the time cycle of certain operations for the embodiment of FIGURE 3.

Similar reference characters are used for similar elements throughout the drawings.

FIGURE 1 illustrates an article 21 to be distributed and loaded. The article 21 shown is a transistor mounted in a can or cap. The article 21 comprises a cap 23, a stem 25 and short leads 27. The typical article has a generally cylindrical shape and is about 0.25 inch in diameter by about 0.50 inch long.

While the apparatus herein is described with respect to loading completed transistors, it will be appreciated that cylindrical or other shaped articles for other purposes may also be handled by the apparatus herein. In general, it is preferred to handle cylindrical articles where the length to diameter ratio is between 4:1 and 2:1. Where higher ratios are encountered, provision must be made to accommodate the long narrow shape of the articles, particularly the clearances around bends along the path of the article. Cylindrical articles having lower ratios and also spherical articles may also be handled. However, with spherical articles there is no orientation needed.

The apparatus herein described is capable of processing upward of 1800 articles per hour. Also, in the apparatus herein described, articles may be fed directly from an article processing unit, or from a reservoir.

FIGURE 2 illustrates a typical package or tray 29 which may be loaded directly by the apparatus herein. The package 29 made of plastic, includes an array of 100 nests. The nests in the first line are designated 31a through 31d. The nests in the second line are designated 32a through 32d. The nests in the last line are designated 33a through 33d. Each nest is designed to accommodate one article 21 with the axis of the article 21 perpendicular to the floor of the tray 29.

It will be noted that the nests in the array are arranged in a cyclical order, but that the order is not completely symmetrical. Thus, there are four nests 31a to 31d in the first line and four nests 32a to 32d in the second line, but the nests of the second line are offset laterally from the nests of the first line. The nests of the third line and each succeeding odd numbered line are aligned with the nests 31 of the first line, the nests of the fourth line and each succeeding even numbered line are aligned with the nests 32 of the second line. Thus, one complete cycle (referred to as the drum cycle) is two lines of 4 nests each or 8 nests. The array also lacks symmetry in that the nests 33a, 33b, 33c, and 33d of the last line on the package are aligned with the nests 31a, 31b, 31c, and 31d, respectively, of the first line, and the last four nests in the last drum cycle are omitted. Thus, the complete package cycle is 100 nests, which comprise 12½ drum cycles of 8 nests, or twenty-five lines of four nests each.

One of the advantages of the apparatus herein is the ability of the apparatus to be programmed to distribute or to load (or both) articles into a wide variety of different arrays which may have different arrangements. The apparatus herein may be programmed to load a definite number of articles fewer than 8 articles in each drum cycle and to load a definite number of articles fewer than 100 articles in each package cycle for the trays of the type shown in FIGURE 2. For example, if it is desired to load 50 articles in each package cycle to be arranged in eight drum cycles of six articles each plus one drum cycle of two, the apparatus herein may be adjusted to follow this program. The devices may be adjusted to load more than 100 articles to a drum cycle where the distribution may require this.

FIGURES 3, 4, and 5 illustrate side, top, and fragmentary end views respectively of a preferred apparatus herein. In its general operation, an article of the type shown in FIGURE 1 passes to the device through a stationary first tube 34, a movable second tube 35, and a stationary third tube 36; all of the tubes 34, 35, and 36 being aligned to provide a continuous channel. The article then passes through one of the tube sections 51 to 58 in a distributor drum 41 to the nests in a package 29 of the type illustrated in FIGURE 2. The package 29 rests on a table 42 and is intermittently moved across the table 42 by a cleat 43 connected to a continuous chain 44 by a chain drive ratchet 85 through a chain drive sprocket 94. The package 29 is advanced one line of nests each half drum cycle.

The drum 41 is shown in only partial detail in FIGURE 3. FIGURE 6 shows the drum 41 in more detail as a partially schematic side view thereof. FIGURE 6 is schematic in that each internal tube with its inlet port and outlet port is shown in section whereas there is actually some axial displacement of the various parts of each tube. The drum is shown in this manner in FIGURE 6 to simplify the explanation of the structure and operation thereof.

The drum 41 is mounted on a drum drive shaft 45 which is coaxial with the drum. The drum 41 is in the form of a hollow right cylinder closed on the sides and top and bottom, except where the shaft 45 passes therethrough. The drum 41 is indexed or rotated in steps in a counter clockwise direction as viewed in FIGURES 3 and 6 by a ratchet assembly 46. The drum may be made of any material, for example, a transparent plastic. The term "drum" is used in a broader sense than right hollow cylinder, the drum 41 may be any support for the ports and passageways, which support has an axis of rotation, for example, a reel or an open framework.

The drum 41 has eight inlet ports $51a$ through $58a$, respectively, the center of which are in a single plane perpendicular to the axis of rotation and at about the middle of the axial dimension of the cylinder. The inlet ports are spaced at equal angular increments around the periphery of the cylinder. The single plane is aligned with the end of the third tube 36, and the position of the drum 41 is adjusted so that at the end of each index one of the inlet ports is opposite the end of the third tube 36 at all times, presenting a continuous path to an article passing therethrough. As illustrated in FIGURE 6, each article is delivered to point 50, where it is received by one of the inlet ports $51a$ to $58a$, respectively. Each inlet port is constructed in the same manner as shown typically in FIGURE 6a. An outer clamping member 47 which may be of brass and having a threaded hole therethrough, is screwed into a threaded hole in the drum 41. Eight transfer tubes 51 to 58 which have flared ends 38, are each slipped through the respective eight holes in the outer clamping member 47 until each rests in its outer member. An inner clamping member 48 is now screwed into each threaded hole in the outer member 47 with the flare 38 of the tube 51 held in pressure engagement between the outer and inner clamping members 47 and 48.

The drum 41 also has eight outlet ports $51b$ through $58b$, respectively, spaced in equal angular increments around its periphery. Each outlet port is displaced about 112.5° from its corresponding inlet port in FIGURE 6. Each outlet port comprises the end of one of the transfer tubes 51 to 58 which extends through a corresponding guide 37 each of which is screwed into a threaded hole in the circular wall of the drum 41. The center of each outlet port lies in a plane parallel to the plane of the center of the inlets $51a$ to $58a$, but displaced axially along the cylindrical surface of the drum 41 a distance according to the particular program desired. In the example, the displacement of outlets $51b$ to $54b$ corresponds to the positions of the first four nests $31a$–$31d$ which comprise the first line of the tray 29 of FIGURE 2, and outlets $55b$ to $58b$ correspond to the positions of the next four nests $32a$–$32d$, which comprise the second line of the tray 29 of FIGURE 2.

Referring now to FIGURES 3 and 6, a simplified explanation of the operation will now be given. With the drum as shown in the position with inlet port $51a$ opposite receiving point 50 which corresponds to the exit end of the third tube 36 of FIGURE 3, and with the outlet port $51b$ opposite the delivery line 49 and the first line of a package 29 opposite a delivery line 49, the first article passes down tubes 34, 35, and 36 through inlet port $51a$, transfer tube 51, and outlet port $51b$, to the first nest $31a$ on the delivery line 49. The drum is now rotated 45° by the ratchet assembly 46 to present inlet port $52a$ opposite the receiving point 50. Since inlet port $52a$ is in the same plane perpendicular to the axis of rotation as inlet port $51a$, inlet port $52a$ is opposite the same receiving point 50. An article passes through tubes 34, 35, 36, 52 to the second nest $31b$. Since outlet port $52b$ is axially displaced from an outlet port $51b$ corresponding to the difference in nest position, the second article is delivered to a different point along a delivery line 49 parallel to the axis of rotation of the drum 41. The drum 41 is now rotated 45° by the ratchet assembly 46 to present inlet port $53a$ opposite the receiving point 50. An article passes through the tubes 34, 35, 36, and 53 to the third nest $31c$. The drum 41 is now rotated 45° by the ratchet assembly 46 to present inlet port $54a$ opposite the receiving point 50. An article passes through the tubes 34, 35, 36, and 54 to the fourth nest $31d$. The drum 41 is now rotated 45° by the ratchet assembly 46 to present inlet port $55a$ opposite the receiving point 50. At the same time the package 29 is moved forward by the cleat 43 to present the second line of nests at the delivery line 49. The fifth through eighth articles are now delivered to the fifth through eighth nests in the same manner as the first through fourth articles were delivered completing the drum cycle. Then, the drum cycle is repeated the desired number of times, with the package advancing one line for each four articles delivered.

In order to limit the number of articles delivered to each package, a counter (described below) counts the number of articles delivered. When the desired number is reached, a new package 29 is moved into position, the drum 41 is rotated to its starting point, and the package cycle starts again with the first article.

If it is desired to substitute a different tray having a different arrangement of nests, a different drum having the outlets therein displaced along the line 49 corresponding to the new nest arrangement may be substituted for the above-described drum 41, or it may be sufficient to replace certain cams, or make the other alterations in parts hereinafter described. If the number of articles per cycle is different than eight then the ratchet assembly 46 and package drive mechanism are adjusted to correspond to the new package arrangement.

If fewer articles than the number in each package cycle are to be delivered, then the counter can stop delivery at the desired number of articles and advance the drum 41 and package drive to start a new package cycle.

The further description of the embodiment of FIGURES 3, 4, and 5 will now be given. A drive motor B1 (shown schematically in FIGURES 3, 4, and 7) is connected to a drive shaft 61 through a drive chain 64 and drive sprocket 63. The drive shaft 61 is mounted on stationary bearings 62. The drive motor B1 may be individual to the loading device herein or, especially where the device is an attachment to another machine, the drive motor B1 may be the same drive motor as said other machine. Cams 84 and 84a are attached to the drive shaft 61 so as to open and close the switches S3 and S6 with each rotation of the shaft 61.

Also mounted on the drive shaft 61 is a drive clutch assembly 70 which normally is engaged. The drive clutch assembly 70 comprises a driving portion 78 and a driven portion 79 which is coaxially mounted on the drive shaft 61. The driving portion 78 of the drive clutch assembly is engageable by a solenoid L1 through a linkage 81. Mounted on the driven portion of the drive clutch is a drum shaft drive cam 65, and a drum shaft drive yoke 67. The drum shaft drive yoke 67 has thereon a drum shaft drive cam follower 66 and a pair of springs 69 attached to a retainer 68 for holding the drum shaft drive cam follower 66 against the drum shaft drive cam 65. When the drum shaft drive cam 65 rotates, it pushes the drum shaft drive yoke 67 in a reciprocating motion. Motion of the drum shaft drive yoke 67 is transferred through a push-rod 82 to the distributor drum shaft 45, through the drum shaft ratchet assembly 46 thereby providing for a regular indexing of the distributor drum 41 through the desired angle of rotation. As shown, the drum shaft 45 will make one revolution for each eight revolutions of the driven portion 79 of the drive clutch assembly.

Also mounted on the driven portion 79 of the drive clutch assembly is a driving gear 71 for driving a driven gear 72 on a cam shaft 73. The cam shaft 73 is supported through bearings 74 on the drive shaft 61, and held in position by a support 75 mounted on the frame of the apparatus. The cam shaft 73 has mounted thereon a package drive cam 76 and a package drive yoke 83. The package drive yoke 83 has a package drive cam follower 77 mounted thereon and is connected through a package drive push rod 80 and a package drive ratchet assembly 85 to a package chain drive shaft 91. The package chain conveyor 44 is mounted around a package chain drive sprocket 94 on the package chain drive shaft 91 and a package chain idler sprocket 96 on a package chain idler shaft 95. In this example, the cam shaft 73 rotates one time for each four rotations of the drive shaft 61. Once each rotation of the cam shaft 73, the package drive cam 76 through the package drive cam follower 77, operates the package ratchet assembly 85 to advance the tray a distance corresponding to the distance between the center lines of adjacent lines of nests in the package 29a. The operation of the apparatus should be considered with the electric circuit diagram of FIGURE 7 and the timing diagrams of FIGURE 8. A drive motor B1 of the device is connected to an electric power source through an electrical connection 100 and a switch 101. The apparatus is actuated by closing the switch 101 which starts the motor B1 which then runs at a constant speed with the drive clutch disengaged. Closing the switch 101 also starts the package conveyor motor B2 (which is shown only in FIGURE 7), which then runs the package conveyor 98 at a constant speed. The control system for the apparatus herein is energized by closing the switch S13. A switch S2 located at the entrance to the first tube 34 for detecting an article in the first tube 34 is connected in series with the switcch S13. If the switch S13 is closed and if the switch S2 is closed because there is an article in the first tube 34, then the closing of the switch S3 is of no effect and the clutch 78 remains engaged and the apparatus goes through its normal cycle. If however either the switch S13 is open or the switch S2 is open because there is no article at the entrance to the first tube 34, then the closing of the switch S3 actuates the solenoid L1 to disengage the clutch 78 through the linkage 81. Near the end of the normal cycle the switch S6 is opened, resetting the switches S2 and S3.

For the normal cycle, an article appears in the first tube 34, a switch S2 (shown in FIGURES 3 and 7) is closed, preventing disengagement of drive clutch assembly 70 and the sequence for indexing the drum begins. The drive shaft 61, through cam 65, push rod 82 and ratchet assembly 46, indexes the drum 41 to a new position and the article falls through the tubes and drum to the proper nest. After four such operations of the drive shaft 61 through cam shaft 73, package drive cam 76, package push rod 80, and package ratchet assembly 85, the package drive chain 44 indexes the package to a new line of nests at the delivery line 49, and the normal cycles are repeated for four more articles. As illustrated, one cycle of the drum delivers eight articles and fills two lines of nests.

If, during the course of any of the article cycles, the operator desires to remove an article for inspection, the switch S5 which is in series with the switch S2 and which is normally closed, is opened manually and operates the solenoid L1 to disengage the clutch assembly 70 so that the drum 41 does not index; and also actuates the inspect solenoid L3 to draw the end of the second tube 35 to a position opposite the end of a fourth tube 36a. The article then passes through the first, second and fourth tubes 34, 35, and 36a to an inspection station (not shown). When the switch S5 is again permitted to close, the switch S6 resets all switches and the normal article cycle is started.

A counter (not shown) counts the number of articles delivered through the drum 41. The counter is set to actuate the new package cycle after a preset number of articles have been delivered. For example, to fill all the nests in the package 29 of FIGURE 2, the counter is set at 100. When the counter reaches its setting, the contact K1 (in series with the drive motor B3) is closed, the new package cycle is started. The direct drive motor B3 is started, the drum stop solenoid L5 is energized and the package stop solenoid L6 is energized. The direct drive motor B3 turns the drum shaft 45 through chain 86, sprockets 87 and 87a, and a friction clutch 88. The driven portion of the friction clutch 88 drives the package drive shaft 91 through sprockets 89 and 89a, chain 90, and friction clutch 93. The package chain drive shaft 91 is rotated until an arm 92 attached to the sprocket bears on a stop which is extended by and a part of the package stop solenoid L6 then the package drive shaft 91 slides in the friction clutch 93. At this point the new package is in position. At the same time the drum shaft 45 rotates until the drum stop 40 reaches the stop arm 39 which is extended by the drum stop solenoid L5. When the drum 41 stops on the drum stop solenoid L5, a switch S7 is opened by the drum 41 which de-energizes the direct drive motor B3. Any override by the direct drive motor B3 is taken up by the drum shaft clutch assembly 88 which permits the drum shaft 45 to slip. A time delay through a relay K2 follows the closing of the switch S7 after which the drum stop solenoid L5 and the package stop solenoid L6 reset pulling the respective stop shafts out of the path of rotation of the drum 41 and the package chain drive sprocket 94, respectively. Then the normal cycle of operation resumes.

A package chain drive idler shaft sprocket 96 is mounted to rotate freely on the package chain drive shaft 95. Also, on the same shaft 95, and mounted for free rotation, is the package conveyor idler drums 97 which are of a size to carry a package conveyor 98 into position to receive packages from the chain conveyor 44. The package conveyor 98 comprises a pair of belts which pass around a drive drum (not shown). The package conveyor 98 operates continuously by the motor B2 and at such speed as to remove the packages from the chain conveyor 44 faster than they arrive at the end thereof. In this way, the packages are removed from in front of the cleat 43 before the cleat 43 moves downward around the idler sprocket 96.

There has been described novel apparatus for loading articles into packages therefor. The novel apparatus may operate separately or as an attachment to another device. The novel devices are easily adjustable to load packages in different article arrays and with different numbers of articles.

What is claimed is:

1. Apparatus for transferring articles between a first point and a plurality of other points comprising a rotatable hollow support having an axis of rotation, a plurality of first ports on said support having centers lying in a first plane perpendicular to said axis, a like plurality of further ports on said support having centers axially spaced from each other, and means providing tubular passageways within the support affording communication respectively between said first ports and corresponding said further ports.

2. Apparatus for transferring articles between a first point and a plurality of other points comprising a hollow support having an axis of rotation, a plurality of pairs of ports in said support, one port of each pair lying in a first plane perpendicular to said axis and the other ports of said pairs being spaced axially from each other, and a like plurality of tubular passageways within the support connecting corresponding pairs of ports in regular order around said support, the said one ports all passing adjacent said first point as said drum rotates, and said other ports respectively passing said other points as said drum rotates.

3. Apparatus for distributing articles from a single point to predetermined positions along a line in regular cyclic order comprising a hollow cylindrical support having an axis of rotation, a plurality of entry ports around the periphery of said support at regular intervals, each of said entry ports having centers lying in a first plane perpendicular to said axis of rotation, an equal plurality of exit ports around the periphery of said drum at regular intervals, said exit ports having centers lying in different planes perpendicular to said axis of rotation, each plane displaced from said first plane a distance corresponding to said predetermined positions, and an equal plurality of tubes within said support, each tube providing a continuous gradually-curved passageway connecting one entry port with one exit port and means affixing one end of each tube to a different one of said entry ports.

4. Apparatus for distributing articles from a single point to predetermined positions along a line in regular cyclic order comprising a circular hollow drum having an axis of rotation, a plurality of entry ports around the periphery of said drum at regular intervals, each of said entry ports having centers lying in a first plane perpendicular to said axis of rotation, an equal plurality of exit ports around the periphery of said drum at said regular angular intervals, said exit ports having centers lying in different planes perpendicular to said axis of rotation, each plane displaced from said first plane a distance corresponding to said predetermined positions, and an equal plurality of tubes within said drum, each tube providing a continuous gradually-curved passageway connecting an entry port with an exit port displaced more than 90° around the periphery of said drum.

5. The apparatus of claim 4 including a stationary feed channel terminating in said first plane and in close spaced relation with the periphery of said drum, and means for indexing said drum around said axis to present said entry ports in registry with the termination of said feed channel in regular sequential order.

6. The apparatus of claim 5 including means presenting a receiver for each article passing through said drum.

7. The apparatus of claim 6 including means preceding said stationary feed channel for selectively diverting the flow of articles from entering said stationary channel means.

8. Apparatus for distributing articles from a single point to predetermined positions along a line in regular cyclic order comprising a circular drum having an axis of rotation, a plurality of entry ports around the periphery of said drum at regular intervals, each of said entry ports having centers lying in a first plane perpendicular to said axis of rotation, an equal plurality of exit ports around the periphery of said drum at regular intervals, said exit ports having centers lying in different planes perpendicular to said axis of rotation, each plane displaced from said first plane a distance corresponding to said predetermined positions, and an equal plurality of tubes, each tube connecting one entry port with one exit port, a stationary first tube having two open ends, one of said ends being in said first plane and in close spaced relation with the periphery of said drum, electromechanical means for indexing said drum around said axis to present said entry ports in regular sequential order in registry with said one end of said tube, an electric switch in said stationary tube actuatable by an article passing through said first tube, said electric switch being electrically connected to said indexing means; a movable second tube having two open ends and normally positioned with one end thereof, opposite the other end of said first tube to produce a single continuous channel through both tubes, means for selectively moving said one end of said second tube out of opposition to said first tube, and means for singly introducing articles into the other end of said second tube.

References Cited in the file of this patent

UNITED STATES PATENTS

| 2,177,301 | Keyes | Oct. 24, 1939 |
| 2,206,816 | Levitt | July 2, 1940 |
| 2,921,604 | Zettl | Jan. 19, 1960 |